United States Patent
Bueti et al.

(10) Patent No.: US 7,129,821 B2
(45) Date of Patent: Oct. 31, 2006

(54) COMMUNICATION SYSTEMS AND METHODS USING MICROELECTRONICS POWER DISTRIBUTION NETWORK

(75) Inventors: Serafino Bueti, Waterbury, VT (US); Adam J. Courchesne, Jericho, VT (US); Kai D. Feng, Essex Junction, VT (US); Kenneth J. Goodnow, Essex Junction, VT (US); Gregory J. Mann, Winfield, IL (US); Scott T. Vento, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 10/711,082

(22) Filed: Aug. 20, 2004

(65) Prior Publication Data
US 2006/0038444 A1    Feb. 23, 2006

(51) Int. Cl.
G05B 11/01    (2006.01)
(52) U.S. Cl. .................. 340/310.11; 174/250; 375/220
(58) Field of Classification Search ........... 340/310.11, 340/310.12, 538, 538.11; 375/220; 307/1; 361/62; 257/207; 174/250
See application file for complete search history.

(56) References Cited

U.S. PATENT DOCUMENTS

| | | | |
|---|---|---|---|
| 3,938,129 A | | 2/1976 | Smither ...................... 340/310 |
| 5,452,344 A | | 9/1995 | Larson ....................... 379/107 |
| 5,477,091 A | * | 12/1995 | Fiorina et al. ......... 340/310.11 |
| 5,835,005 A | | 11/1998 | Furukawa et al. ..... 340/310.01 |
| 6,029,199 A | * | 2/2000 | Allen et al. .................. 709/224 |
| 6,335,494 B1 | * | 1/2002 | Gregor et al. .............. 174/261 |
| 6,373,377 B1 | | 4/2002 | Sacca et al. ........... 340/310.01 |
| 6,781,355 B1 | * | 8/2004 | Gauthier et al. ............ 323/233 |

* cited by examiner

*Primary Examiner*—Thomas Mullen
(74) *Attorney, Agent, or Firm*—Downs Rachlin Martin PLLC

(57) ABSTRACT

A communication system, which includes a microelectronics chip including a power distribution network; a transmitter operatively configured to generate a communication signal and provide the communication signal to the power distribution network; and a receiver operatively configured to receive the communication signal from the power distribution network. A method is also provided for transmitting a communication signal via a power distribution network of a microelectronics chip.

20 Claims, 15 Drawing Sheets

COMMUNICATION SYSTEMS AND METHODS USING MICROELECTRONICS POWER DISTRIBUTION NETWORK

BACKGROUND OF INVENTION

1. Field of the Invention

The present invention generally relates to the field of integrated circuit communications systems. In particular, the present invention is directed to communication systems and methods using a microelectronics power distribution network.

2. Background of the Invention

As the density of integrated circuits, number of functions, and the need for supervisory control for chip characteristics such as power and heat, increases, the need exists to exploit every communication channel available on the die or chip. This has traditionally been done by running more wires and increasing the number of layers of metal on a die. Studies have shown that as the number of layers increase, the actual routability of these new wires plateaus because of the inability to create vias to other metal layers due to the density of existing wires and vias.

The use of radio transmission of information from one location on the chip to another has been investigated as an additional communication avenue. Also the use of light transmission through the oxide layers has been explored.

The use of communications over alternating current macro utility lines has been used for many years. For example, power line companies have used communications over power lines to read electric meters, and consumers have used home control systems, such as the X10 system, to switch lights using 110 volt power lines throughout the home. However, the use of a microelectronics power distribution network for communication has heretofore not been examined or implemented.

U.S. Pat. No. 3,938,129 to Smither describes data transmission over a line carrying alternating current power. U.S. Pat. No. 5,452,344 to Larson describes a frequency shift key (FSK) carrier communication system for transmitting and receiving data on electric utility lines, particularly for communication with electric utility meters and vending machines. U.S. Pat. No. 5,835,005 to Furukawa et al. describes power line communication systems employing relay stations, particularly for use with large refrigerated container carriers and communication with the refrigerated containers over electrical lines. U.S. Pat. No. 6,373,377 to Sacca et al. describes a power supply with coupling for using the AC power line to communicate digital data from within a digital device, such as a computer. The prior uses of power line communication deal only with transmissions over utility and house level alternating current power lines, and do not address the particular difficulties inherent to power distribution networks of microelectronics chips or communications over direct current power lines.

The power systems of a microelectronics chip are extremely sensitive to fluctuations in power and to the noise carried on that power. In addition the power systems are susceptible to interferences produced by the integrated circuits of the chip itself. Merely keeping the power balance correct for the circuits of the chip is in itself a difficult task. The introduction of additional signals onto the power distribution network makes it more difficult to achieve this balance. The power environment of a microelectronics chip differs widely from the more robust utility and household power lines previously used to transfer information. Typical microelectronics chips work with power that ranges from 0.7 volts (V) to 5 V, which is in comparison to the far greater voltages of utility and household power lines. Although future voltages on microelectronic chips may be higher, the current trend is toward lower voltages. Additionally, utility and household power lines have far greater voltages than present or projected voltages of power distribution networks on microelectronic chips, even if the voltages on microelectronic chips were to go higher. Utility and household power lines have much greater levels of power noise than do power distribution networks of microelectronics chips allowing them to carry additional interference more readily. It is far more difficult a task to place an additional signal on the power distribution network of a microelectronics chip without disrupting the overall noise tolerance of the chip or the power bus driving the chip.

Accordingly, there is a need for new communications avenues on microelectronics chips that can take advantage of the pre-existing power distribution network on the chip itself.

SUMMARY OF INVENTION

The present disclosure provides a communication system, which includes a microelectronics chip having a power distribution network; a transmitter operatively configured to generate a communication signal and provide the communication signal to the power distribution network; and a receiver operatively configured to receive the communication signal from the power distribution network.

The present disclosure further provides a communication system including a power distribution network operating on direct current; a transmitter operatively configured to generate a communication signal and provide the communication signal to the power distribution network; and a receiver operatively configured to receive the communication signal from the power distribution network.

The present disclosure still further provides a method of communicating in an integrated circuit, the method including generating a communication signal; providing the communication signal to a first location on a power distribution network of a microelectronics chip; and receiving the communication signal from a second location on the power distribution network.

BRIEF DESCRIPTION OF DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
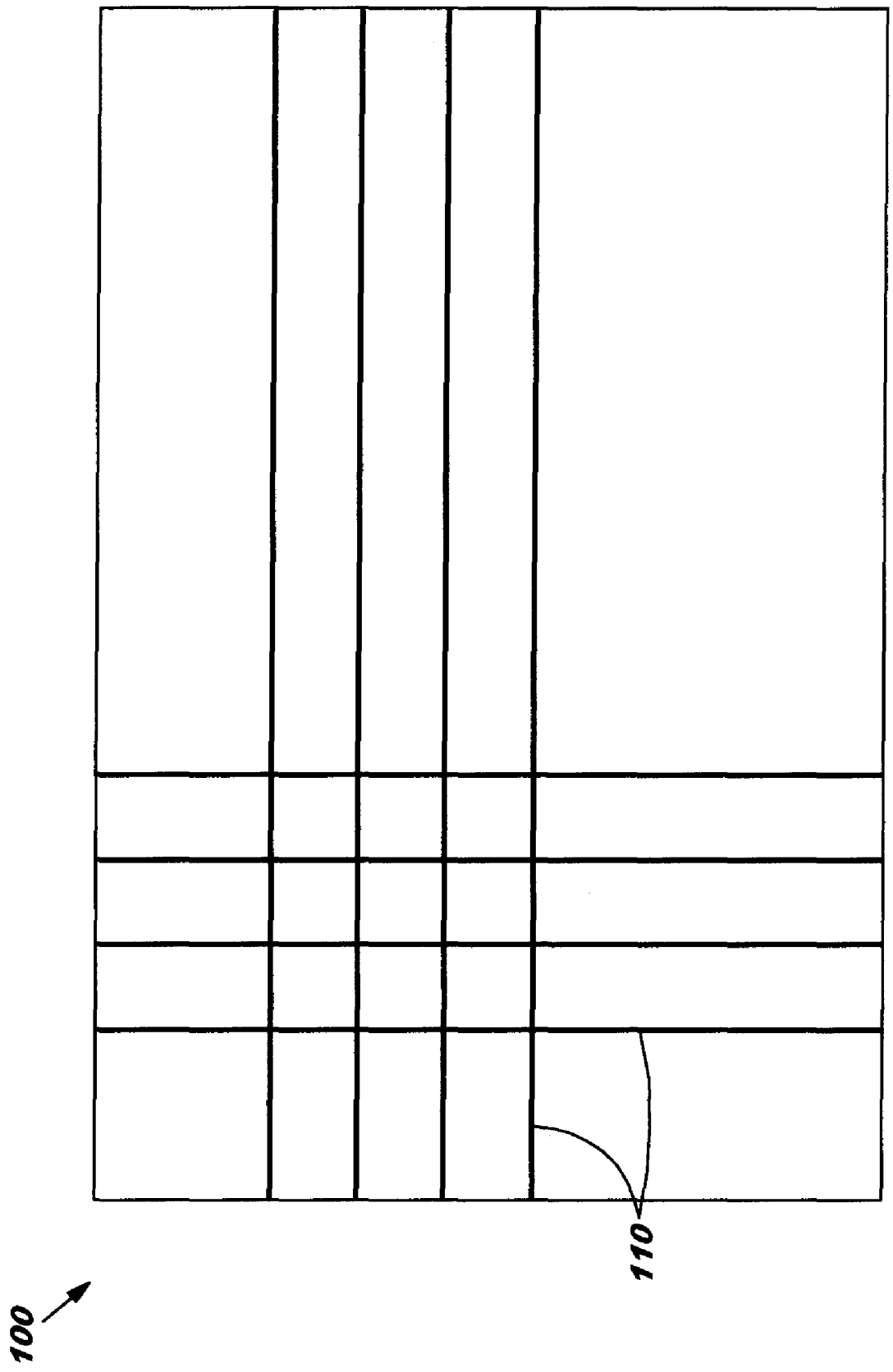
FIG. 1 illustrates one example of a portion of a power distribution network of a microelectronics chip.

The present disclosure provides a communication system and method for transmitting a communication signal over a power distribution network on a microelectronics chip. Referring now to FIG. 1, a portion 100 of a power distribution network 110 of a microelectronic chip is shown. Typically, the power distribution network 110 of a microelectronic chip is implemented such that the power lines of the network are arranged in a grid format similar to that shown in FIG. 1. However, power distribution network 110 may have any orientation of power lines. A power distribution network can encompass the entire area of the chip or can encompass only a portion thereof, depending on the power distribution needs of the circuits on the chip. Further, a plurality of power distribution networks 110 can exist on a single chip, thus allowing different power voltages to be delivered to different circuits on the chip. Examples of implementations for a plurality of power distribution networks 110 include, but are not limited to, having different layers of wiring or grids, and having "voltage islands," in which different regions of the chip have different power distribution networks 110. Typically, a microelectronics chip will have a power distribution network for delivering a direct current (DC) voltage to circuits and a power distribution network for ground.

Figure 2:
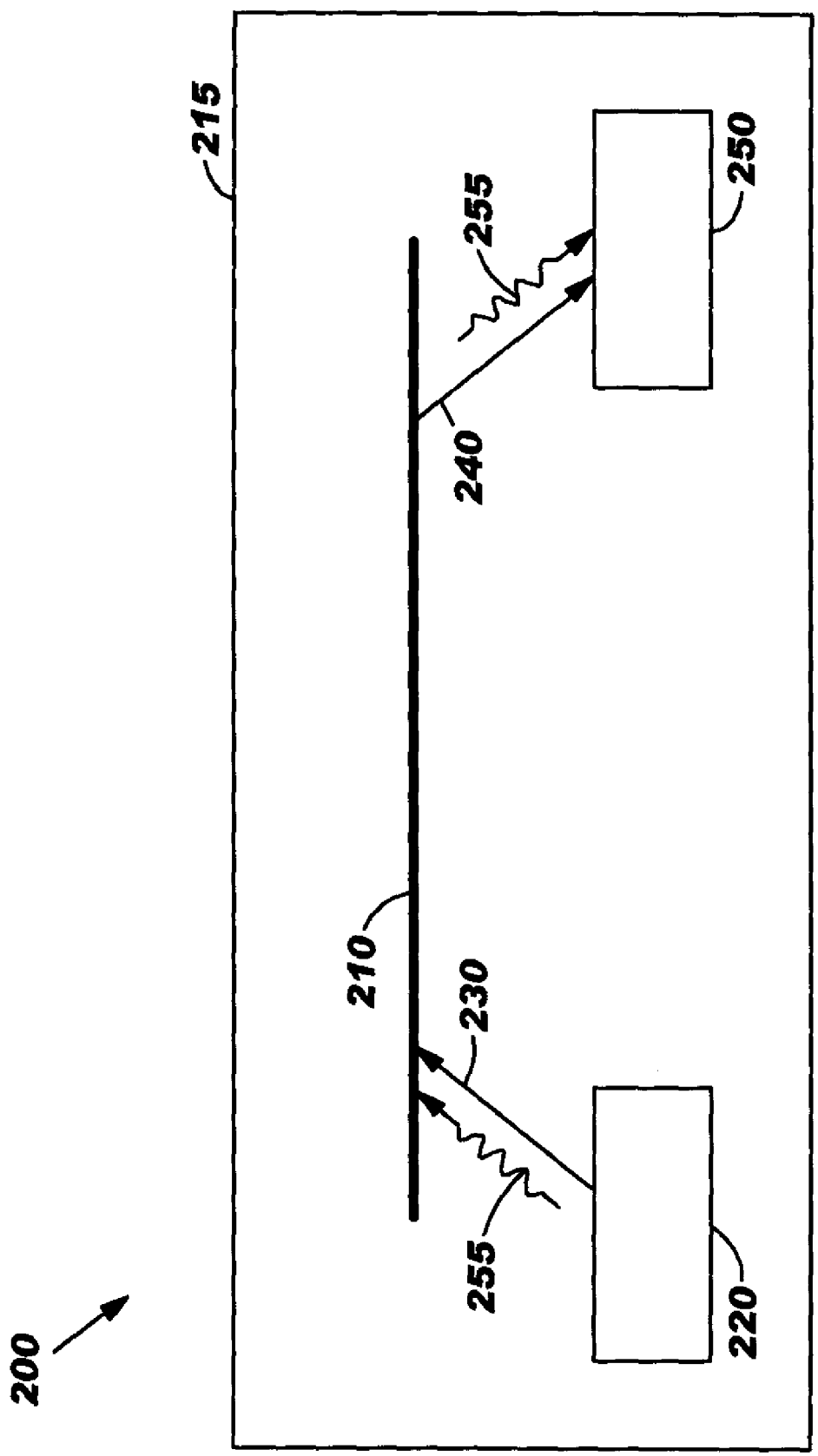
FIG. 2 illustrates one example of a communication system and method using a power distribution network of a microelectronics chip.

FIG. 2 shows an example of a communication system and method 200 using a power distribution network 210 of a microelectronics chip 215. Transmitter 220 is coupled via coupling 230 to power distribution network 210. Power distribution network 210 is coupled via coupling 240 to receiver 250. Transmitter 220 is operatively configured to generate a communication signal 255 and provide the communication signal 255 to the power distribution network 210. Receiver 250 is operatively configured to receive the communication signal 255 from the power distribution network 210.

In one aspect of the present disclosure, the power voltage carried on a power distribution network can be as high or as low as microelectronics chip technology allows. In one example of the present disclosure, the power voltage carried on a power distribution network is not greater than about 10 V. In another example of the present disclosure, the power voltage carried on a power distribution network is not greater than about 5 V. In yet another example of the present disclosure, the power voltage carried on a power distribution network is about 0.7 V to about 1.5 V.

Power distribution networks carry voltages that have some amount of noise or non-symmetric interference. Examples of causes for this noise or interference include, but are not limited to, the voltage generating source and the circuits that use the power. The present disclosure provides for a system and method for delivering a communication signal across a power distribution network. The communication signal can include additional non-symmetric interference on a power distribution network. The communication signal can also include symmetric interference provided to one power distribution network with an inverse of the symmetric interference being provided to another power distribution network, both of which are received and interpreted as a differential signal.

A communication signal provided to a power distribution network may be made available at any point along the power distribution network. The circuits on the chip would view the communication signal as additional power noise. The communication signal should be of low enough power that it does not negatively impact the performance and operation of the circuits of the chip or the power bus. However, the communication signal must be strong enough to carry the desired information. The communication signal can be used to carry any information needed to be communicated to, from, or within the chip. Examples of information that can be transmitted include, but are not limited to, data, information about heat, voltage island information, power control, voltage control, and regulation of power modes. The communication signal can be of low or high bandwidth. When a high bandwidth signal is used, a masking technique should be used to obscure the information into a noise-like distribution. Examples of how this obscuring can be implemented include, but are not limited to, the use of spread spectrum and encoding technologies.

A variety of bandwidths can be used to transmit information as a communication signal on a power distribution network of a microelectronics chip. The faster the transmission rate, the more information that can be transmitted. However, faster transmission also requires more energy, which leads to more interference. Transmission rates that meet the needs of information transfer but do not produce so much interference as to disable the power grid are acceptable.

In one example, a 2400 baud system can be used implementing Manchester encoding. Manchester encoding evenly distributes the power of the communication signal and, thus, helps minimize the impact of impact on system noise levels. It should be noted that a variety of encoding systems are available to one of ordinary skill in the art and the present disclosure contemplates the use of these encoding systems. A 2400 baud example system using Manchester encoding produces a signal rate of 4800 baud with a shortest signal period of 208 μs and a time constant of the signal maximum of 104 μs. In this example, the interference frequency is much lower, 2400 to 4800 kHz, than the normal operating frequencies of modern microelectronic chips, e.g. application specific integrated circuits (ASICs).

Figure 3:
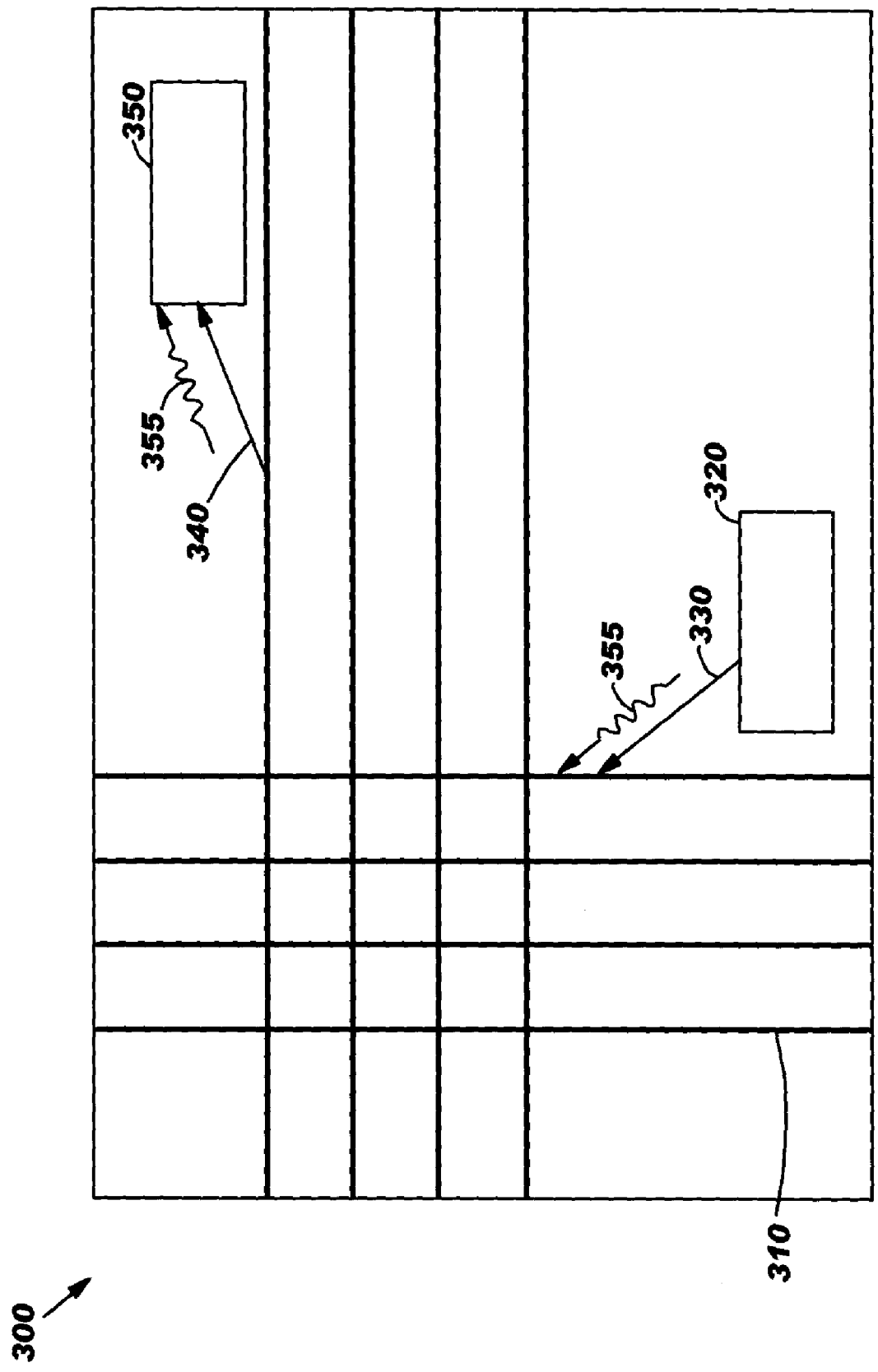
FIG. 3 illustrates another example of a communication system and method using a power distribution network of a microelectronics chip.

A variety of techniques for encoding information on a communication signal are known to those of ordinary skill in the art. Examples of encoding techniques include, but are not limited to, amplitude shift key (ASK), frequency shift key (FSK), and spread spectrum. Another example of an encoding technique includes encoding information to appear as random noise by using a random-like pattern. The decoder in such a system would use known information about the random-like pattern to detect and decode the information FIG. 3 shows another embodiment of the present disclosure, in which a portion 300 of a microelectronics chip is shown having power distribution network 310. Transmitter 320 is coupled via coupling 330 to power distribution network 310. Power distribution network 310 is coupled via coupling 340 to receiver 350. Transmitter 320 is operatively configured to generate a communication signal 355 and provide the communication signal 355 to the power distribution network 310. Receiver 350 is operatively configured to receive the communication signal 355 from the power distribution network 310.

Figure 4:
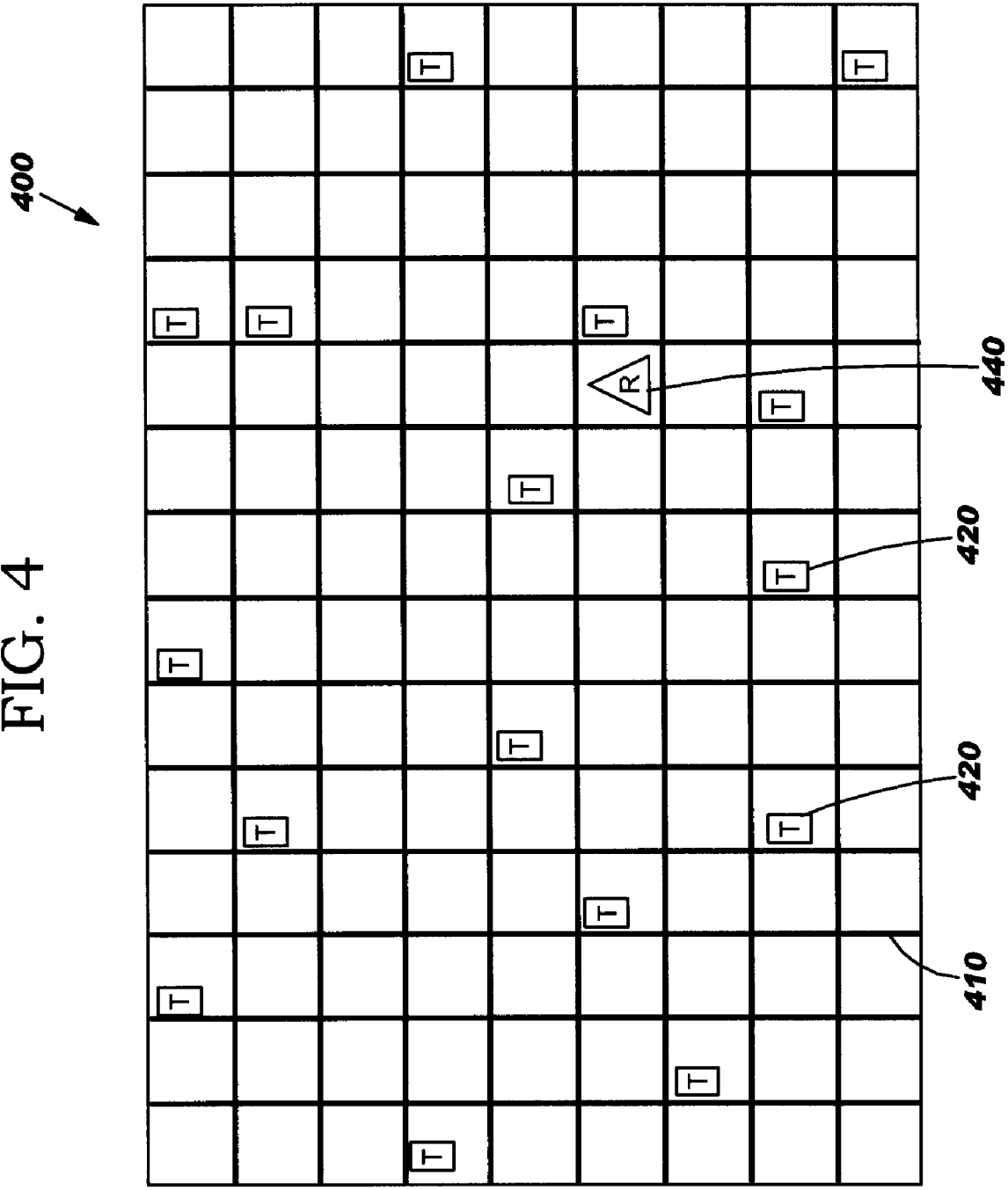
FIG. 4 illustrates yet another example of a communication system and method using a power distribution network of a microelectronics chip.

FIG. 4 shows yet another embodiment of the present disclosure, in which a portion 400 of a microelectronics chip is shown having a power distribution network 410. A plurality of transmitters 420 are coupled via couplings (not shown) to power distribution network 410. Power distribution network 410 is coupled via coupling (not shown) to receiver 440. In this approach plurality of transmitters 420 will produce a plurality of communication signals. The plurality of communication signals can either be received and viewed in the aggregate by receiver 440, or a scheme employed to receive and view each of the plurality of communication signals individually. An example of such a scheme includes randomizing transmission from plurality of transmitters 420 and using a labeling scheme, such as packet numbering, to uniquely identify each of the plurality of communication signals.

In still another embodiment of the present disclosure, the inverse of that shown in FIG. 4 is possible. In such an example, a single transmitter with a plurality of receivers can be employed. The single transmitter can provide a communication signal to a power distribution network. This communication signal can include global information to be delivered to the plurality of receivers.

In still yet anther embodiment of the present disclosure, a plurality of transmitters and a plurality of receivers can be employed with a single power distribution network. An example of a method for each of the plurality of receivers to distinguish the appropriate communication signal from amongst the plurality of communication signals generated by the plurality of transmitters include the use of packet labeling schemes and using different signal frequencies for each receiver. In the latter example, the aggregate noise generated by the plurality of signal frequencies should not exceed the power bus requirements.

Figure 5:
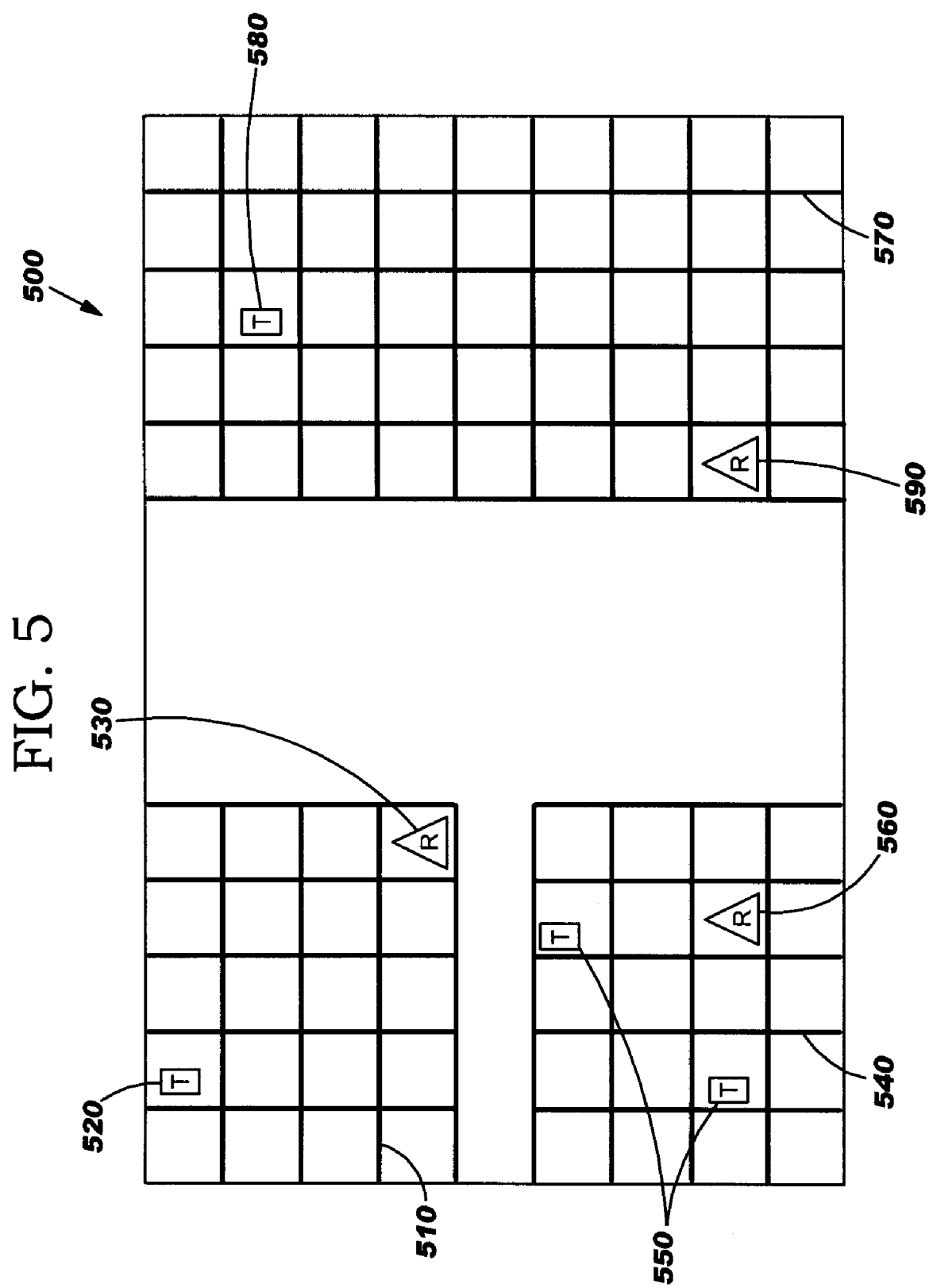
FIG. 5 illustrates one example of a plurality of voltage islands having communication systems.

FIG. 5 shows a further embodiment of the present disclosure, in which a portion 500 of a microelectronics chip is shown having a power distribution network 510. Transmitter 520 is coupled via a coupling (not shown) to power distribution network 510. Power distribution network 510 is coupled via a coupling (not shown) to receiver 530. FIG. 5 also shows a second power distribution network 540. A plurality of transmitters 550 is coupled to power distribution network 540. Power distribution network 540 is coupled to receiver 560. A third power distribution network 570 is shown. Transmitter 580 is coupled to power distribution network 570. Power distribution network is coupled to receiver 590. Each of power distribution networks 510, 540, and 570 create a voltage island, in which the power is delivered to the corresponding region of the microelectronic chip by each of the power distribution networks. FIG. 5 shows three voltage islands. It should be noted, however, that the present disclosure contemplates any number of one or more voltage islands. Within each voltage island, the transmission of a communication signal is substantially similar to that described above with respect to other embodiments.

Figure 6:
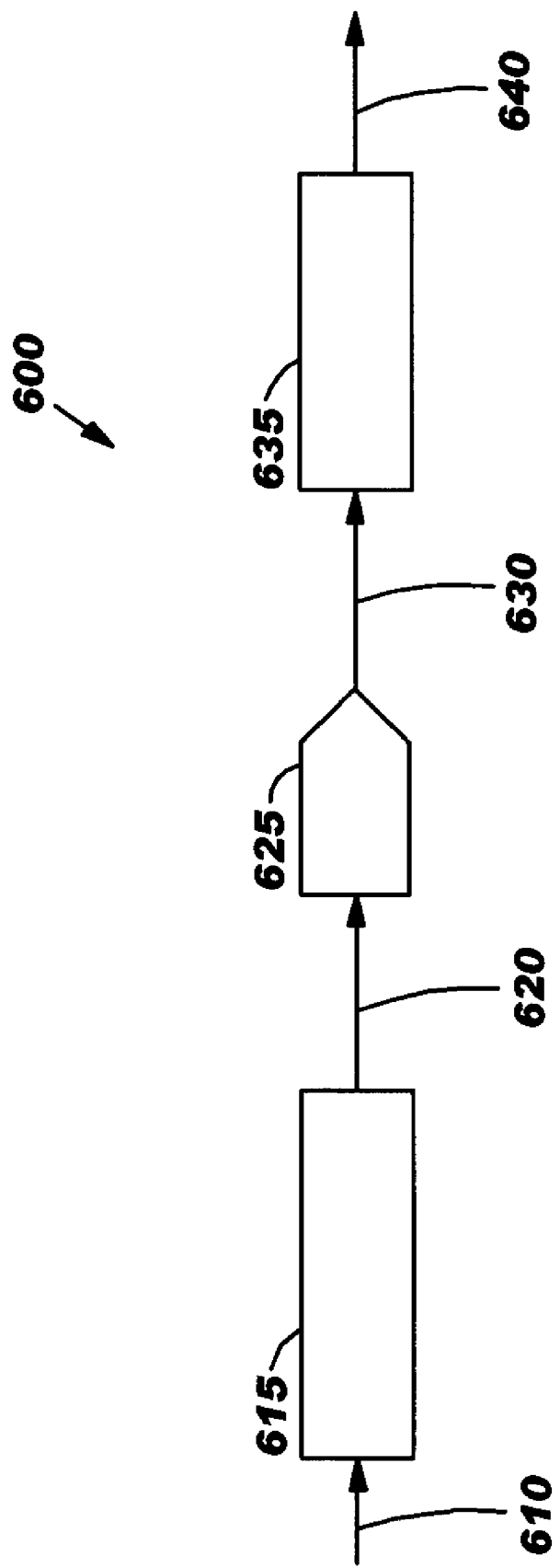
FIG. 6 illustrates one example of a transmitter.

In one aspect, a transmitter and a receiver used in the system of the present invention can be implemented as simple circuits as part of the chip itself. The simple circuits required take up a minimum amount of space on the chip. Any transmitter capable of generating a communication signal that can be provided to a power distribution network of a microelectronics chip and have that communication signal received by a receiver is suitable as a transmitter in the systems and methods of the present disclosure. FIG. 6 shows one embodiment of a transmitter 600 according to the present disclosure. A communication information input is provided as a serial signal 610 to oscillator 615. Serial signal 610 is used to modulate oscillator 615. Oscillator 615 provides base frequency signal 620 to digital-to-analog converter 625. Digital-to-analog converter 625 provides analog signal 630 to coupling capacitor 635. Coupling capacitor 635 provides communication signal 640 to a power distribution network. In one example, the oscillator 615 can be a digital clock signal, which can be digitally mixed with serial signal 610. Mixing can be done by any known means. Examples of mixing techniques include, but are not limited to, amplitude shift key (ASK) and frequency shift key (FSK). In one aspect, the output of the mixing can be sent to a voltage shifter to convert the signal to a small percentage of the voltage value of the power distribution network. For example, for use in a 1.4 V power distribution network, the value of the communication signal could be shifted to +/−0.014 V centered around the actual voltage value of the power distribution network. One example of a mixing and voltage shifting circuitry can use CMOS digital transistors in an analog configuration. Another example of a mixing and voltage shifting circuitry can use a digital-to-analog converter. These circuitry examples provide proper performance with minimal circuit space required. However, a variety of mixing and voltage circuitries are available to one of ordinary skill in the art, as are a variety of general transmitter circuitries.

Figure 7:
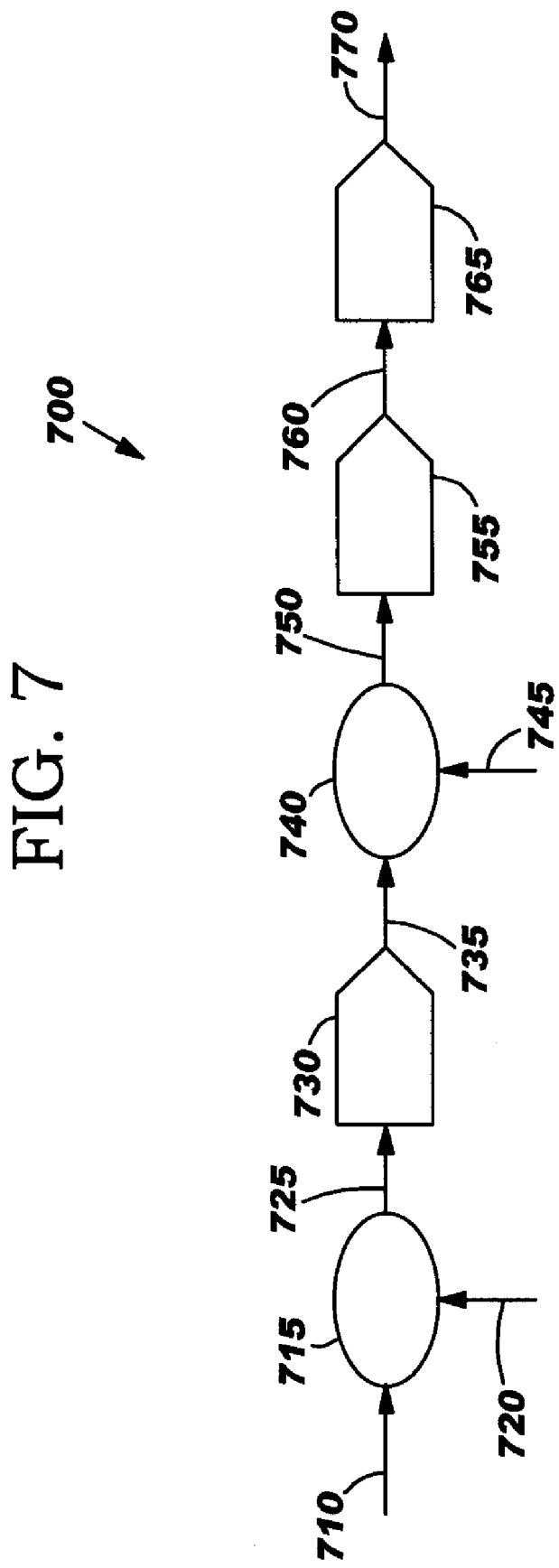
FIG. 7 illustrates one example of a receiver.

Any receiver capable of receiving a communication signal from a power distribution network of a microelectronics chip can be utilized as a receiver in the systems and methods of the present disclosure. FIG. 7 shows one embodiment of a superheterodyne type receiver 700. Input signal 710, which includes a communication signal and the power voltage of a power distribution network (as well as any noise associated with the power voltage), is provided to mixer 715. Intermediate frequency 720 is provided to mixer 715. Input signal 710 and intermediate frequency 720 are mixed and provided as mixed signal 725 to a first amplifier 730. Mixed signal 725 is amplified and amplified signal 735 is provided to demodulation mixer 740. Demodulation frequency 745 is used to demodulate amplified signal 735. Demodulation output 750 is provided to differential amplifier 755. The output 760 of differential amplifier 755 is provided to a second amplifier 765. The amplified output signal is then available for decoding and use. Depending on the required use of the information, the amplified output signal can be level shifted to produce a digital signal prior to decoding and use. In one aspect, any of the mixers and amplifiers in this embodiment can be implemented using CMOS circuits, thus reducing the space on the chip required for the receiver circuitry.

Figure 8:
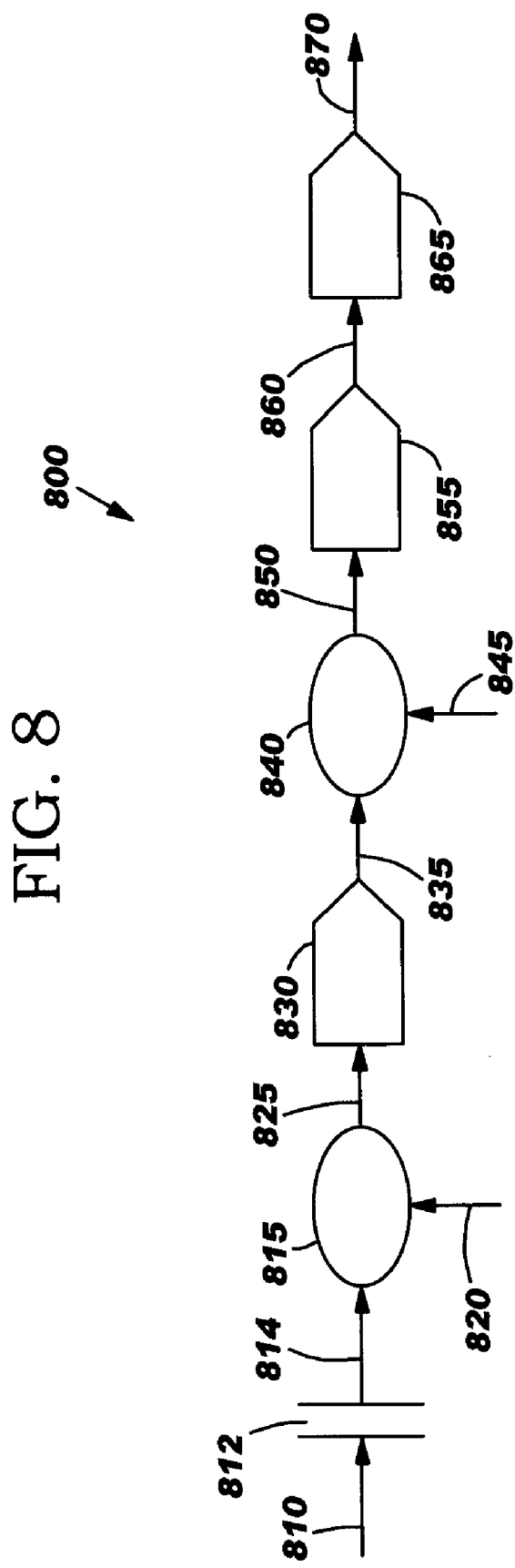
FIG. 8 illustrates another example of a receiver.

FIG. 8 shows another example of a receiver 800. Input signal 810 is provided to a coupling capacitor 812. Coupled signal 814 is provided to mixer 815. Intermediate frequency 820 is provided to mixer 815. Coupled signal 814 and intermediate frequency 820 are mixed and provided as mixed signal 825 to a first amplifier 830. Mixed signal 825 is amplified and amplified signal 835 is provided to demodulation mixer 840. Demodulation frequency 845 is used to demodulate amplified signal 835. Demodulation output 850 is provided to differential amplifier 855. The output 860 of differential amplifier 855 is provided to a second amplifier 865. The amplified output signal is then available for decoding and use. Depending on the required use of the information, the amplified output signal can be level shifted to produce a digital signal prior to decoding and use. In one aspect, any of the mixers and amplifiers in this embodiment can be implemented using CMOS circuits, thus reducing the space on the chip required for the receiver circuitry. In another aspect, coupling capacitor 812 can be implemented using a polysilicon or diffusion layer. In yet another aspect, coupling capacitor 812 can be implemented using a CMOS transistor.

Figure 9:
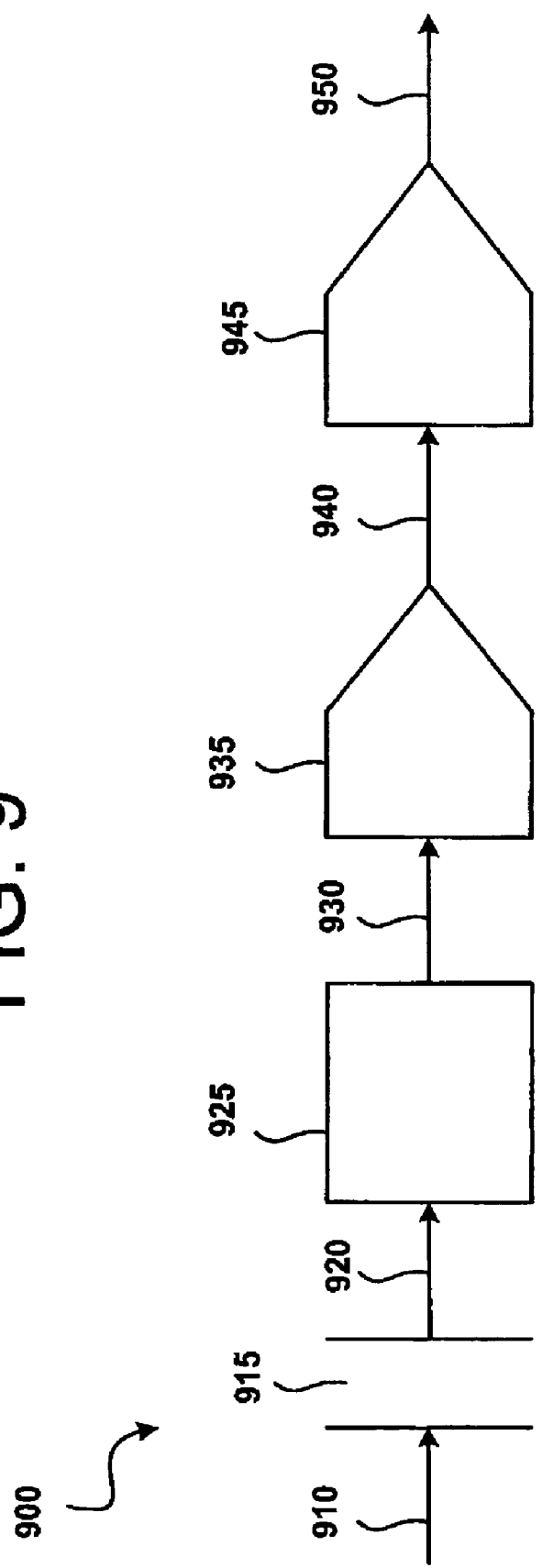
FIG. 9 illustrates yet another example of a receiver.

FIG. 9 shows yet another example of a receiver 900. Input signal 910 is provided to decoupling capacitor 915. Signal 920 is provided to notch filter 925, which filters out all but the communication signal 930. Notch filter 925 can include CMOS transistors. Communication signal 930 is provided to amplifier 935. Amplified communication signal 940 is provided to level shifter 945. Level shifter 945 can be implemented as a operational amplifier. Output communication signal 950 can be used and/or decoded.

In still a further embodiment according to the present disclosure, a noise level detector can be used to detect the instantaneous and average noise of a power distribution network according to the present disclosure. Depending on the amount of noise on the power distribution network a go/no-go decision as to whether a communication signal should be sent can be made. Any noise level detector circuitry that is known in the art can be used for this purpose. One example of a noise level detector circuitry includes an analog-to-digital conversion of the voltage of a given power distribution network. The voltage of the resulting digital signal is first level shifted and the noise amplified. The resulting amplified digital value can then be stored and/or compared against a fixed value. The resulting amplified digital value could also be stored in a storage capacitor with a known discharge rate. The cumulative value in the storage capacitor at any given time can be used to determine the average noise value.

Figure 10:
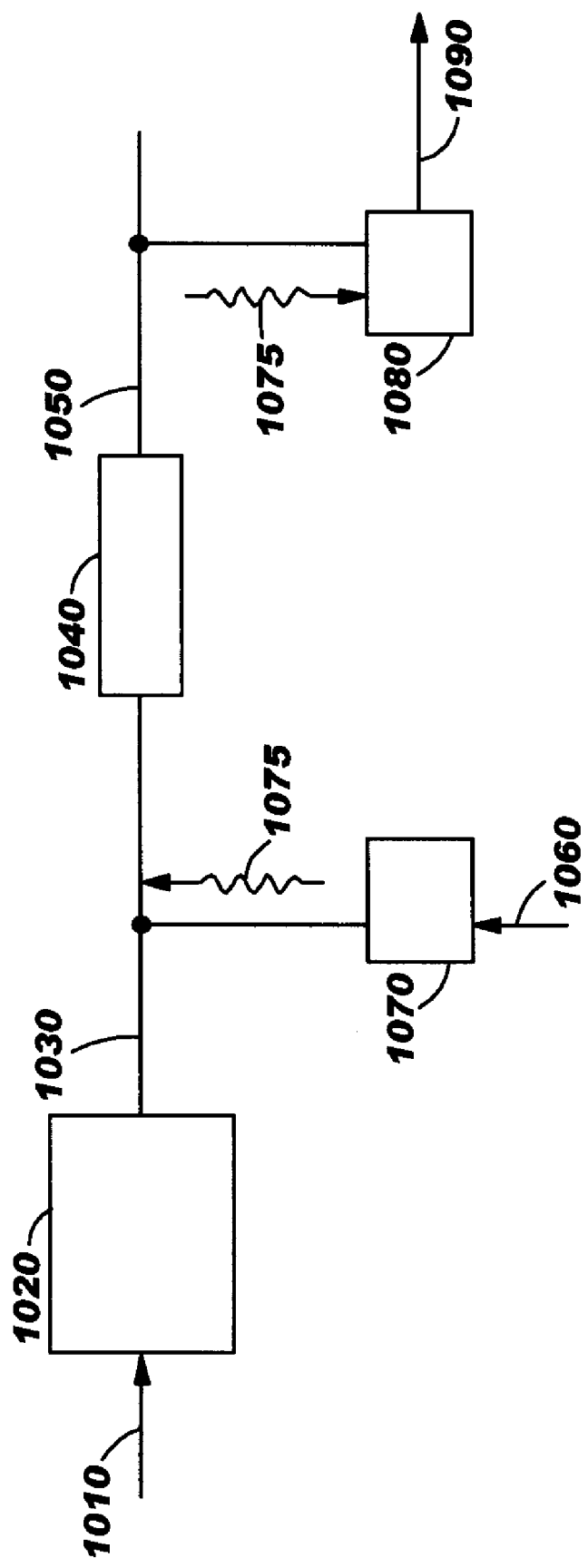
FIG. 10 illustrates one example of a model communication system and method using a power distribution network of a microelectronics chip.

FIG. 10 to FIG. 14 illustrate example circuitry used to model transmission of a communication signal over a power distribution network of a microelectronics chip and example communication signal waveforms. Turning now to FIG. 10, an example of a circuitry 1000 used to simulate a communication system and method according to the present disclosure is shown. An incoming voltage 1010 is provided to voltage regulator 1020. Typically, a microelectronics chip will receive power from off chip through a voltage regulator that resides on the chip and scales down the main power voltage to a voltage useful for the chip circuitry. On-chip voltages depend on the technology of the chip. Example on-chip voltages of modern chips can range from about 0.7 V to about 5 V. Referring again to FIG. 10, a scaled down voltage is provided as the voltage to a first portion of a simulated power distribution network 1030. First portion of simulated power distribution network 1030 is coupled to power line simulator 1040. In this example, power line simulator 1040 includes a ten segment RC network, each segment including a 10 ohm resistor and a 1 pico Farrad (pF) capacitor. Power line simulator 1040 simulates a power line of a very large integrated chip, thus providing a worst-case test for communicating over a power distribution network. Power line simulator 1040 is coupled to second portion of a simulated power distribution network 1050. Information input signal 1060 is provided to transmitter 1070. Transmitter 1070 is coupled to first portion 1030 and provides a communication signal 1075 to first portion 1030. Receiver 1080 is coupled to second portion 1050 and receives communication signal 1075 from second portion 1050. Receiver 1080 provides output information signal 1090 for use and/or decoding.

Figure 11:
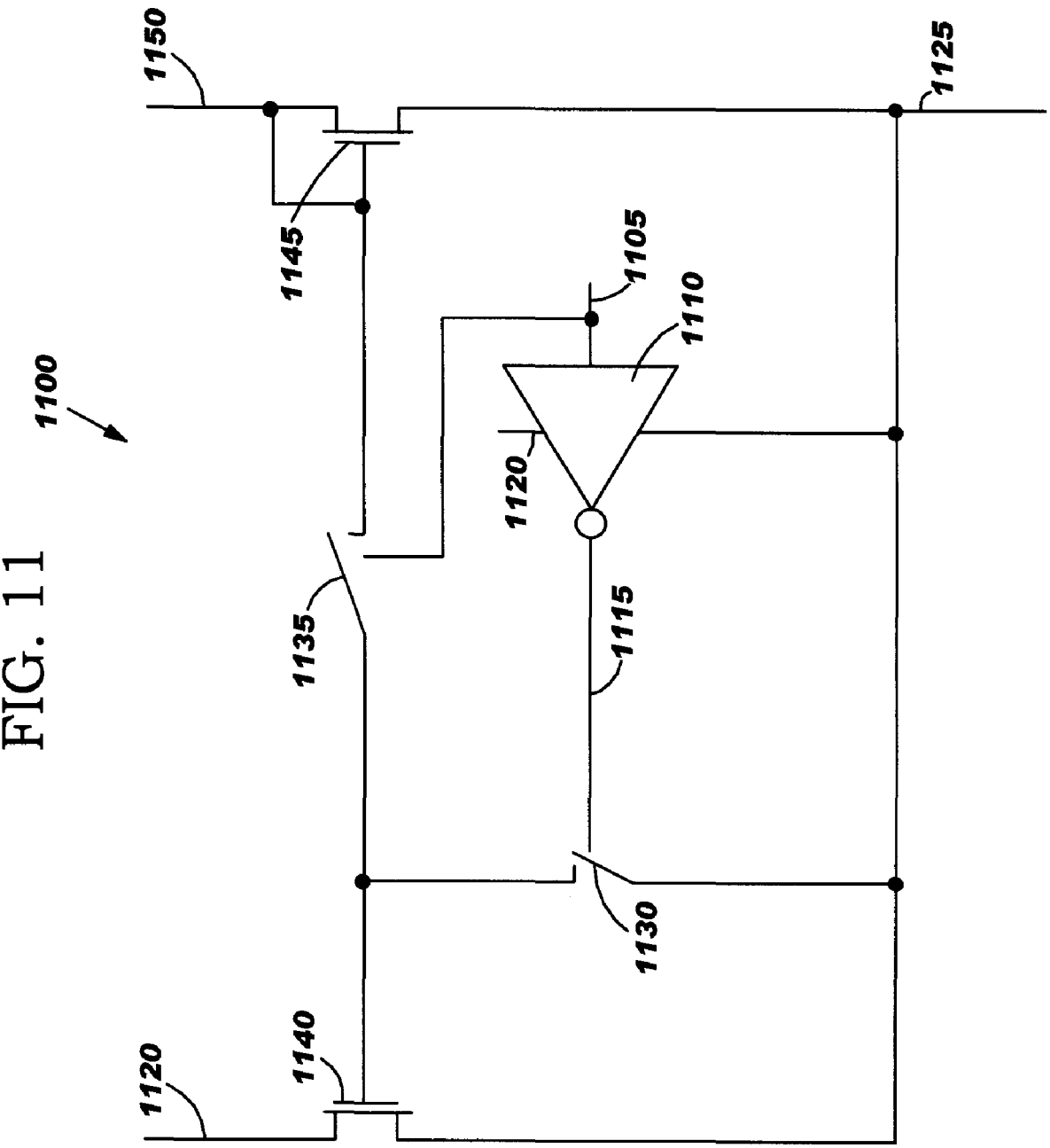
FIG. 11 illustrates another example of a transmitter.

FIG. 11 shows an example of a current sink transmitter 1100 having incoming information signal 1105 coupled to inverter 1110. The output of the inverter 1110 is provided via connection 1115 to first switch 1130. Inverter 1110 is also connected to power distribution network voltage 1120 and to ground 1125. Incoming information signal 1105 is also provided to second switch 1135. First field effect transistor (FET) 1140 and second FET 1145 complete the circuit with one side of first FET 1140 being connected to power distribution network voltage 1120 and one side of second FET 1145 being connected to reference current 1150. First switch 1130 and second switch 1135 can also each be configured as FET's. FET 1140 and FET 1145 form a switching current mirror. When second switch 1135 is turned on and first switch 1130 is turned off, FET 1140 sinks current from power distribution network voltage 1120. FET 1145 is the primary side of the current emitter and reference current 1150 is constantly provided thereto. When second switch 1135 is turned off and first switch 1130 is turned on, no current is drawn from power distribution network voltage 1120. With an example communication frequency of about 8 MHz, this transmitter will produce a couple mV voltage AC communication signal on the power distribution network voltage 1120 on the power distribution network of a microelectronics chip.

FIG. 2 shows an example of a receiver 1200 having input signal 1205; resistors 1210, 1215, 1235, and 1240; capacitors 1220 and 1245; and amplifier 1230. First resistor 1210, second resistor 1215, and capacitor 1220 form a low pass filter connected to amplifier 1230 via positive input 1250. Third resistor 1235, fourth resistor 1240, and capacitor 1245 form a high pass filter connected to amplifier 1230 via negative input 1225. Amplifier 1230 is also connected to input signal 1205, reference voltage 1255 and ground 1260. Circuitry space can be conserved by using FET's for one or more of resistors 1210, 1215, 1235, and 1240. The impedance of capacitor 1245 is lower than the resistance of resistors 1235 and 1240. Input signal 1205 includes the power distribution network voltage and a communication signal. Output signal 1265 includes the communication signal amplified and ready for use and/or decoding.

Figure 12:
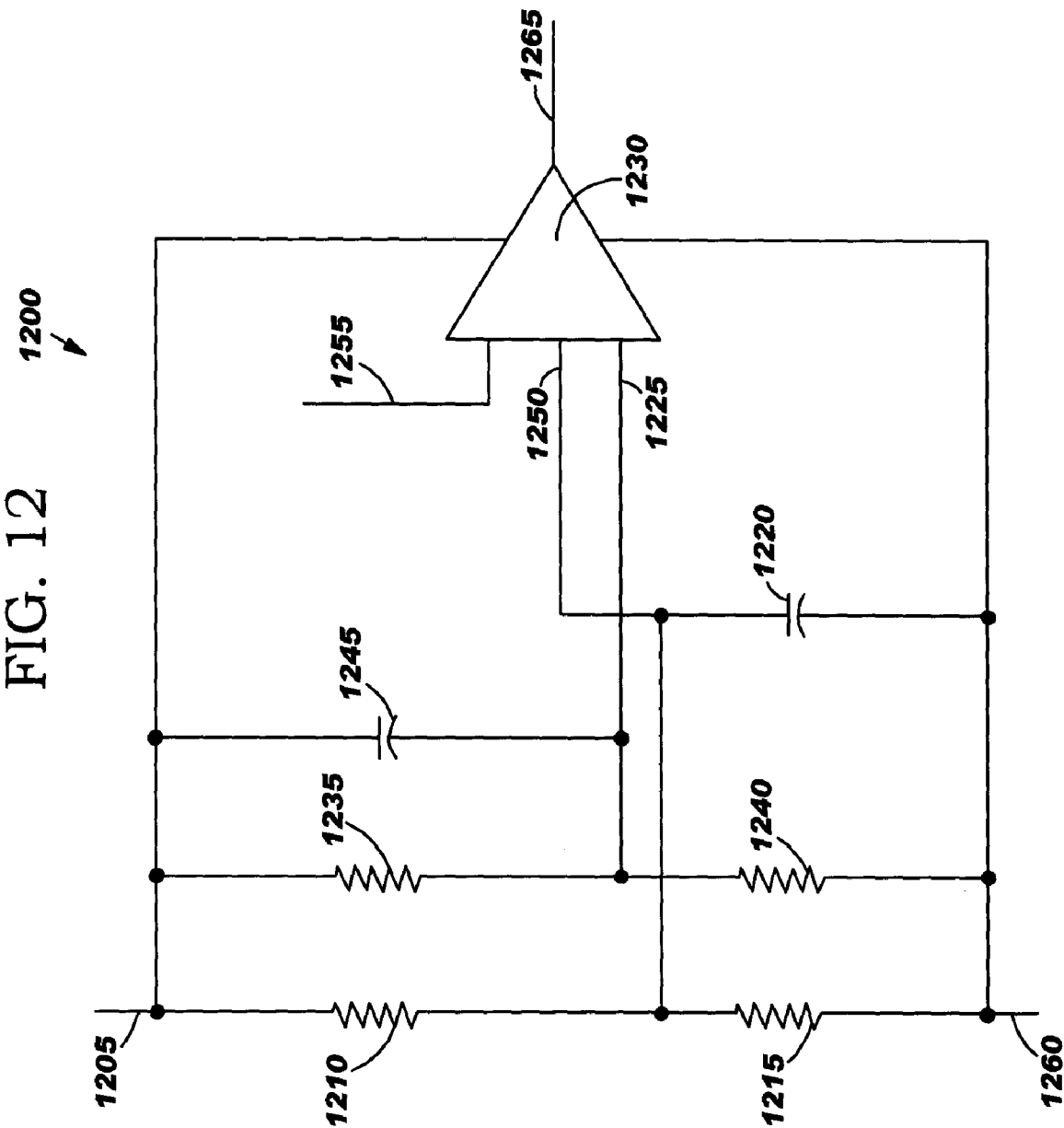
FIG. 12 illustrates still yet another example of a receiver.
Figure 13:
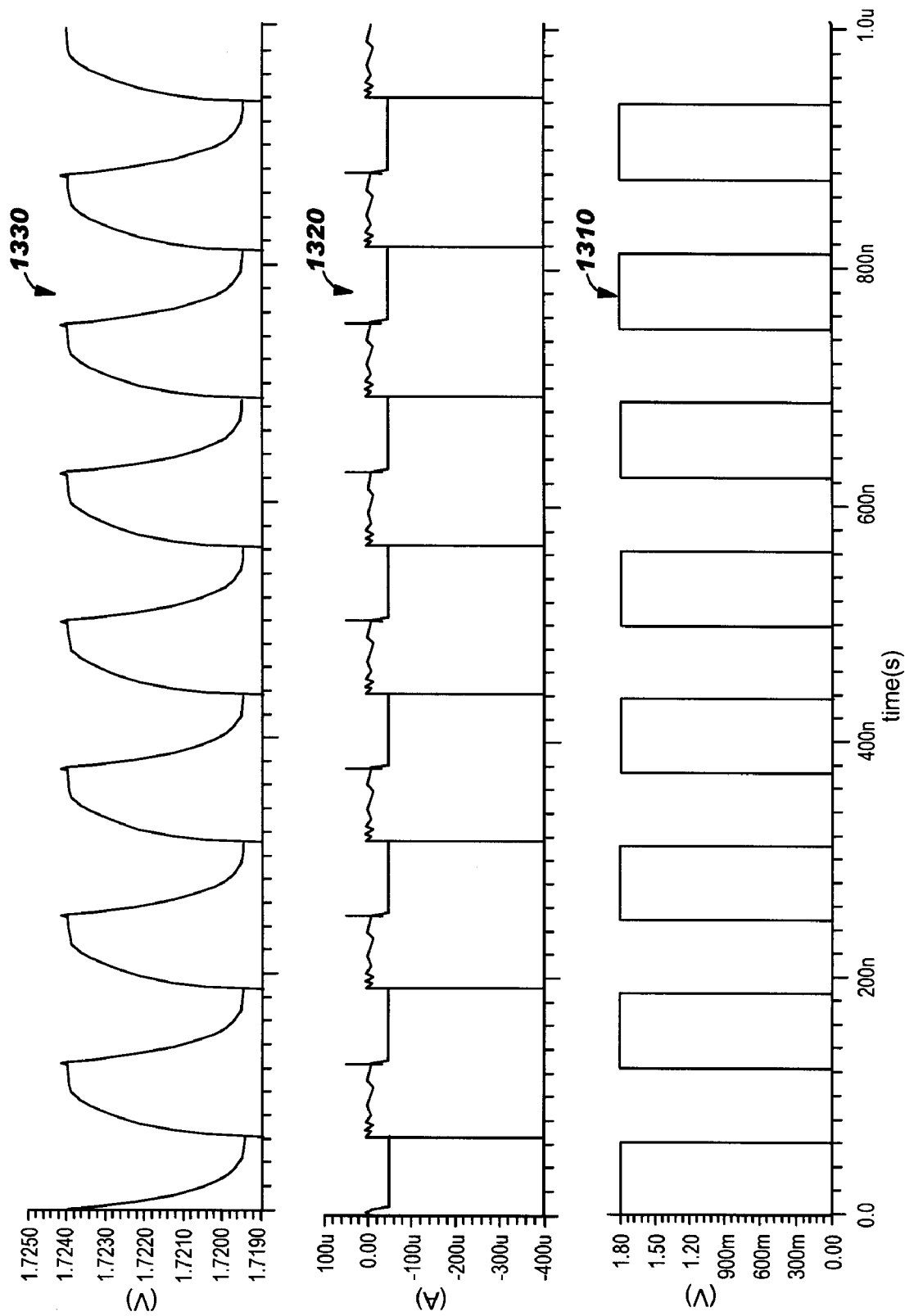
FIG. 13 illustrates various waveforms of an example communications signal.
Figure 14:
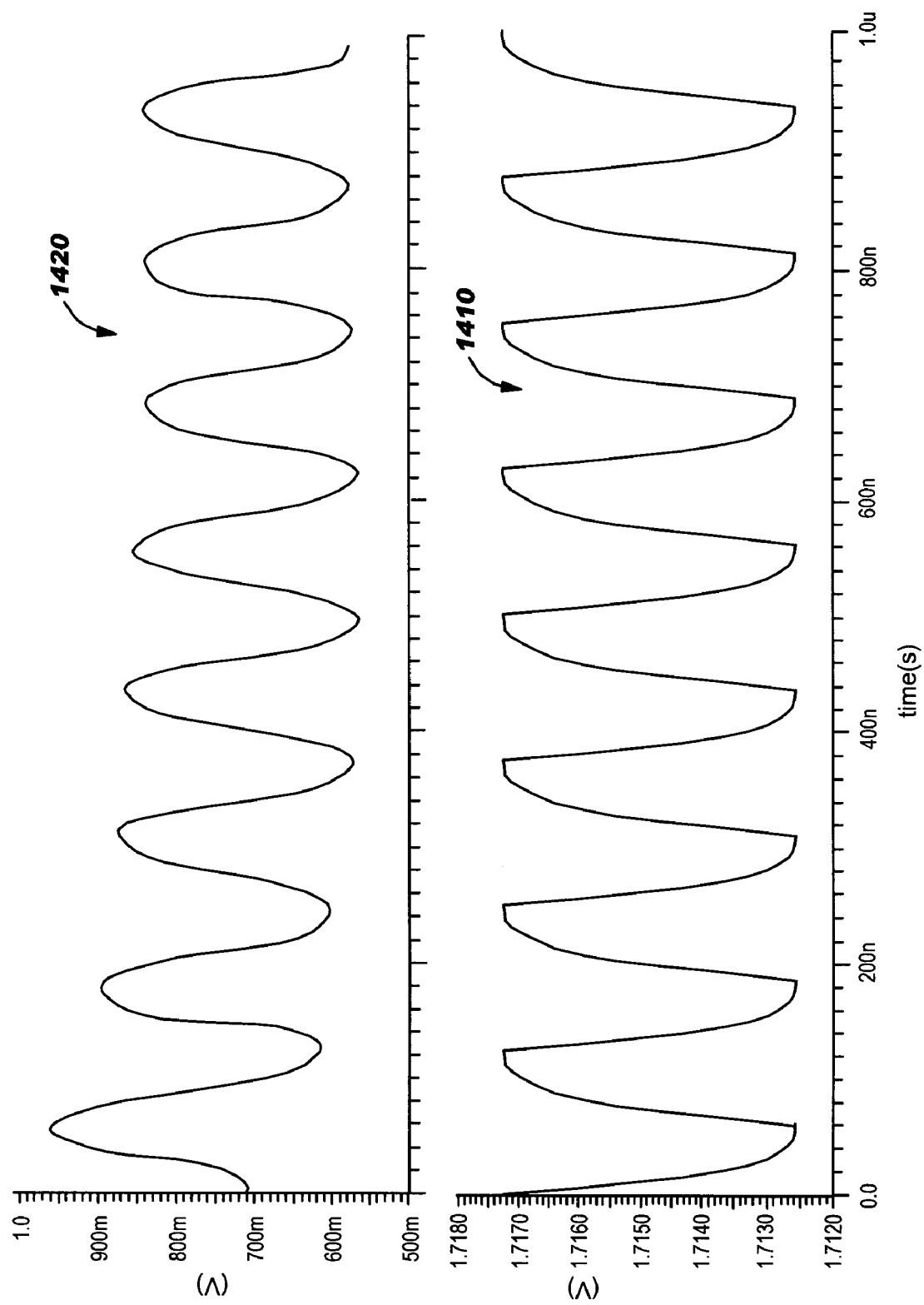
FIG. 14 illustrates further examples of waveforms of an example communications signal.

Using the general circuitry of FIG. 10 with a transmitter according to FIG. 11 used as transmitter 1070 and a receiver according to FIG. 12 used as receiver 1080, a communication signal 1075 was transmitted from the transmitter 1070 to the receiver 1080. The impedance performance of voltage regulator 1020 was measured to determine at which frequency the peak impedance of the voltage regulator occurred, which in this example was about 8 MHz. Accordingly, the frequency of communication signal 1075 was set at about 8 MHz. FIG. 13 shows the example input waveform 1310 for information input signal 1060 in this example. Current waveform 1320 represents the current sinked to transmitter 1070 in this example. Voltage waveform 1330 represents the communication signal waveform with an amplitude of about 5 mV on first portion 1030 of power distribution network in this example. FIG. 14 shows voltage waveform 1410, which represents communication signal waveform with an amplitude of about 4 mV on second portion 1050 of power distribution network in this example. Voltage waveform 1420 represents the waveform of output information signal 1090 at an amplitude of about 300 mV.

Figure 15:
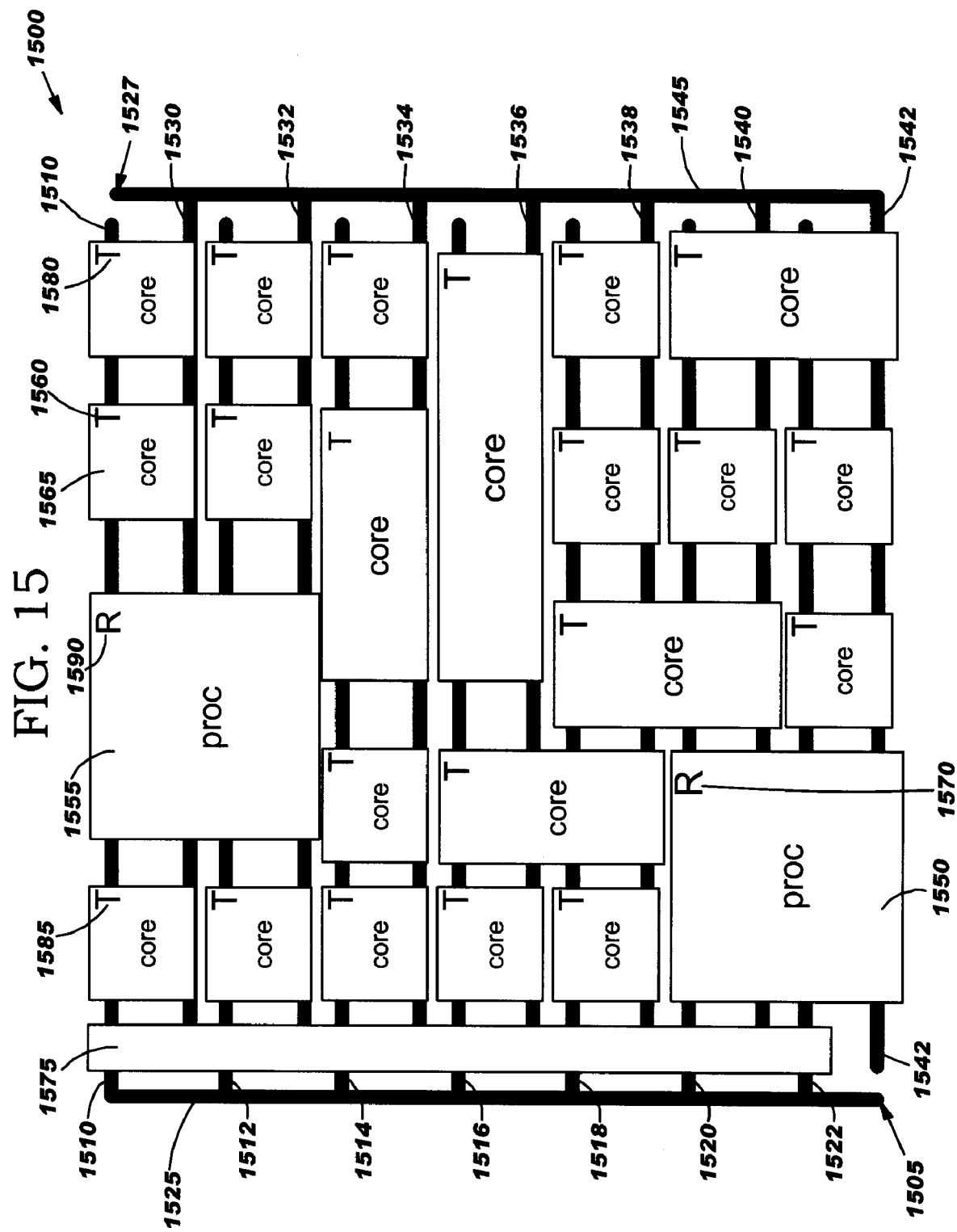
FIG. 15 illustrates an additional example of a communication system and method using a power distribution network of a microelectronics chip and employing a power data switch.

In still yet a further embodiment, a communication system according to the present disclosure may include a power data switch segmenting a power distribution network into a plurality of power distribution network segments and being operatively configured to control routing of a communication signal amongst the plurality of power distribution network segments. FIG. 15 illustrates one example of a communication system 1500 having a first power distribution network 1505 including one or more power lines, here represented as power lines 1510, 1512, 1514, 1516, 1518, 1520, and 1522, branching from first connecting power line 1525. Second power distribution network 1527 includes one or more power lines, here represented as power lines 1530, 1532, 1534, 1536, 1538, 1540, and 1542, branching from second connecting power line 1545.

In certain microelectronics chip applications, it is desirable to use predesigned logic cores, or macros, which may include one or more circuits and an internal power distribution network of their own. One of ordinary skill in the art will recognize that a variety of core designs are available. Typically, a core is placed on top of a power line of a power distribution network or the power lines of the power distribution network are built around already positioned cores. FIG. 15 illustrates a plurality of cores, first processor 1550, and second processor 1555. In this example, each of the cores and processors are operatively configured to connect to a power line of first power distribution network and to a power line of second power distribution network. Typically, a microelectronics chip includes a power distribution network for positive voltage and a power distribution network for ground. For example purposes, two power distribution networks 1505 and 1527 are shown in FIG. 15, one of which can carry positive voltage and the other ground. It is contemplated that either or both the positive voltage or ground distribution networks can be implemented to transmit a communication signal. Further, any number of additional power distribution networks can be utilized, any one of which may be implemented to transmit a communication signal.

Referring again to FIG. 15, a plurality of transmitters are each represented by the letter T. A plurality of receivers are each represented by the letter R. Each of the plurality of transmitters is operatively configured to generate a communication signal and provide the communication signal to a power line of a power distribution network. For example, transmitter 1560 of core 1565 is operatively configured to generate a communication signal and provide the communication signal to power line 1510 of power distribution network 1505. Each of the plurality of receivers is operatively configured to receive a communication signal from a power line of a power distribution network. For example, receiver 1570 is operatively configured to receive a communication signal from power line 1520 of power distribution network 1505. In this example, each of the cores is configured with a transmitter and each of the processors is configured with a receiver, such that the cores can send communication signals to the processors over power distribution network 1505.

In this example, power data switch 1575 is implemented across power lines of first power distribution network 1505. Power data switch 1575 is operatively configured to act as a data filter and router such that a communication signal transmitted on one the power lines of power distribution network 1505 is not necessarily transmitted on another of the power lines of first power distribution network 1505. In effect, power data switch 1575 segments first power distribution network 1505 into smaller power distribution networks, or power distribution network segments, in which a communication signal or a plurality of communication signals can be transmitted and received without influencing the other smaller power distribution networks. For example, power line 1510 is segmented by power data switch 1575 such that a communication signal transmitted by transmitters 1560, 1580, and 1585 can be segmented off so that only receiver 1590 can receive the communication signal, if desired. The communication signal on power line 1510 can be isolated such that the other power lines do not carry the communication signal and the attendant power noise. However, by using switching circuitry, power data switch 1575 can allow a communication signal on one power line of a power distribution network to pass to one or more other power lines of a power distribution network as desired. For example, a communication signal transmitted by transmitter 1560 could be switched by power data switch 1575 to allow the communication signal to travel on power line 1520 and be received by receiver 1570. Power data switch 1575 provides controllable communication segmenting and routing across segments of a power distribution network. It should be noted that, although FIG. 15 shows transmitters and receivers as part of cores and processors, a power data switch can be implemented with any configuration of a power distribution network, transmitter, and receiver.

In one aspect, a power data switch can also provide switching and routing of communication signals across different power distribution networks. For example, in FIG. 15 power data switch 1575 is connected to power lines of first power distribution network 1505 and to power lines of second power distribution network 1527. If desired, power data switch 1575 can be configured to switch a communication signal onto a power line of second power distribution network 1527. Also, power data switch 1575 can be configured to receive a communication signal from a power line of second power distribution network 1527 and provide the communication signal to another power line of second power distribution network 1527 or to a power line of first power distribution network 1505.

A power data switch can be implemented using a variety of switching technologies known to one of ordinary skill in the art. In one example, conventional switching and routing wiring and circuitry separate from the wiring of the power distribution network itself can be used to connect power lines of a power distribution network. In another example, a receiver and/or transmitter can be provided at an interface of a power data switch and a power line of a power distribution network, the receiver configured to receive one or more communication signals from the power line and the transmitter configured to transmit one or more communication signals on the power line. The wiring and circuitry of the power data switch can connect the receiver and/or transmitter at the interface with one power line of a power distribution network with a receiver and/or transmitter at an interface with another power line of the same or a different power distribution network. In yet another example, a receiver and/or transmitter can be provided at a junction of a power line of a power distribution network and a connecting power line of a power distribution network, the receiver configured to receive one or more communication signal from the power line and the transmitter configured to transmit one or more communication signals on the power line. The connecting power line of the power distribution network provides connectivity to and between the receiver and/or transmitter at one junction of a power line and the connecting power line and a receiver and/or transmitter at a junction of another power line and the connecting power line. Additional filtering circuitry at each junction provides switching and routing direction to the transmitters and receivers. The connecting power line thus acts as a backbone for communication signals to travel from and to one power line and another.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

The invention claimed is:

1. A communication system comprising:
   (a) a microelectronics chip comprising a power distribution network;
   (b) a transmitter operatively configured to generate a communication signal and provide said communication signal to said power distribution network; and
   (c) a receiver operatively configured to receive said communication signal from said power distribution network.

2. A communication system according to claim 1, wherein said power distribution network comprises a wire grid.

3. A communication system according to claim 1, wherein said transmitter comprises a current sink transmitter.

4. A communication system according to claim 1, wherein said power distribution network operates on a direct current power voltage.

5. A communication system according to claim 4, wherein said communication signal is superimposed on said direct current power voltage.

6. A communication system according to claim 4, wherein said communication signal has a base frequency that corresponds to the peak impedance of said direct current power voltage.

7. A communication system according to claim 1, wherein said power distribution network has a power voltage, said power voltage having a value not greater than 10 volts.

8. A communication system according to claim 1, wherein said communication signal comprises a spread spectrum signal.

9. A communication system according to claim 1, wherein said microelectronics chip comprises one or more voltage islands.

10. A communication system according to claim 9, wherein said communication signal differs on at least two of said one or more voltage islands.

11. A communication system according to claim 1, comprising a plurality of microelectronics chips, wherein said communication signal travels from a first one of said plurality of microelectronics chips to a second one of said plurality of microelectronics chips.

12. A communication system according to claim 1, wherein said microelectronics chip comprises said transmitter and said receiver.

13. A communication system according to claim 1, further comprising a power data switch segmenting said power distribution network into a plurality of power distribution network segments and operatively configured to control routing of said communication signal amongst said plurality of power distribution network segments.

14. A communication system according to claim 1, wherein said microelectronics chip comprises a core.

15. A communication system comprising:
   (a) a power distribution network operating on direct current, said power distribution network being part of a microelectronics chip;
   (b) a transmitter operatively configured to generate a communication signal and provide said communication signal to said power distribution network; and
   (c) a receiver operatively configured to receive said communication signal from said power distribution network.

16. A communication system comprising:
   (a) a power distribution network operating on direct current, said power distribution network having a power voltage, said power voltage having a value not greater than 10 volts;
   (b) a transmitter operatively configured to generate a communication signal and provide said communication signal to said power distribution network; and
   (c) a receiver operatively configured to receive said communication signal from said power distribution network.

17. A communication system according to claim 16, wherein said power distribution network is part of a microelectronics chip.

18. A method of communicating in an integrated circuit, the method comprising:
   (a) generating a communication signal;
   (b) providing said communication signal to a first location on a power distribution network of a microelectronics chip; and
   (c) receiving said communication signal from a second location on said power distribution network.

19. A method according to claim 18, said power distribution network has a power voltage, said power voltage having a value not greater than 10 volts.

20. A method according to claim 18, wherein said power distribution network operates on a direct current power voltage.

* * * * *